United States Patent [19]

Lazarchik et al.

[11] 4,160,251

[45] Jul. 3, 1979

[54] HYBRID DUAL MODE RADIOMETRIC SYSTEM

[75] Inventors: Robert E. Lazarchik, Largo; Robert S. Roeder, Dunedin, both of Fla.

[73] Assignee: Sperry Rand Corporation, New York, N.Y.

[21] Appl. No.: 861,752

[22] Filed: Dec. 19, 1977

[51] Int. Cl.² ............................................. G01W 1/00
[52] U.S. Cl. .............................. 343/100 ME; 343/6 R
[58] Field of Search ............ 343/100 ME, 6 R, 7 AG

[56] References Cited
U.S. PATENT DOCUMENTS

| | | | |
|---|---|---|---|
| 3,599,207 | 8/1971 | Foiani et al. | 343/100 ME |
| 3,787,857 | 1/1974 | Lazarchik et al. | 343/100 ME |
| 3,921,169 | 11/1975 | Lazarchik et al. | 343/100 ME |

Primary Examiner—Maynard R. Wilbur
Assistant Examiner—Lawrence Goodwin
Attorney, Agent, or Firm—Howard P. Terry

[57] ABSTRACT

An improved high frequency radiometric system features time shared passive and active modes of operation for correlation of active and passive signal returns. The processed, normalized, and stored passive signals are subtracted from similarly treated active signals to suppress the effect of returns from back ground terrain, thus enhancing true target recognition. A second channel provides discrimination against jamming and spurious signals, thus reducing false alarms.

11 Claims, 8 Drawing Figures

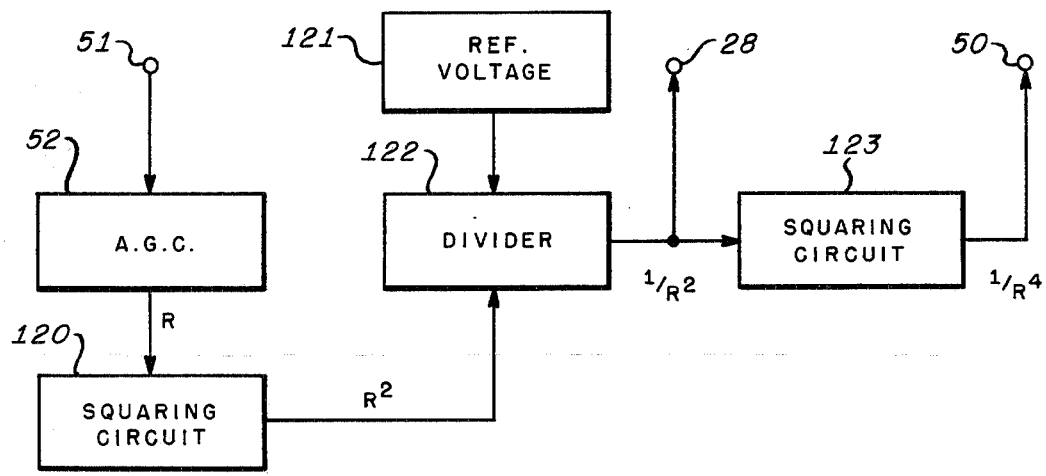
FIG.4.
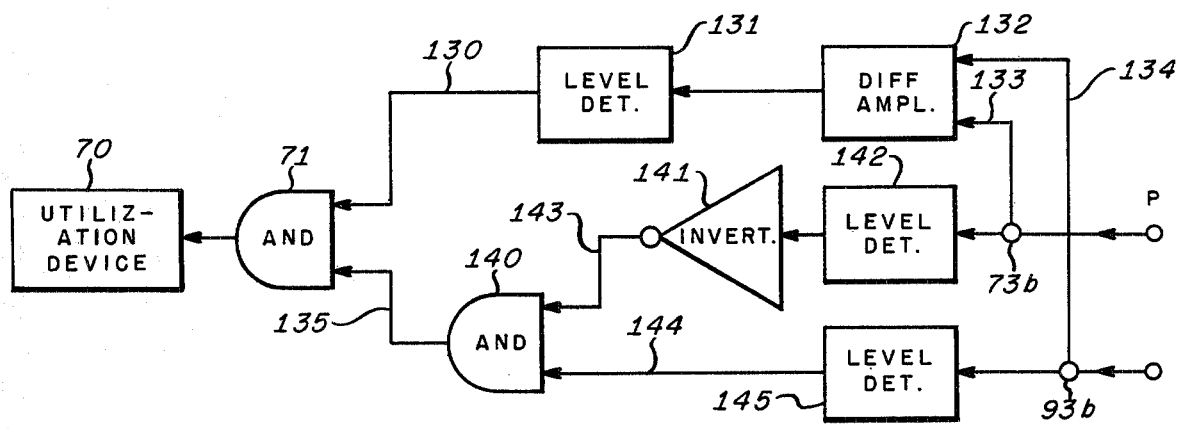
FIG.5.
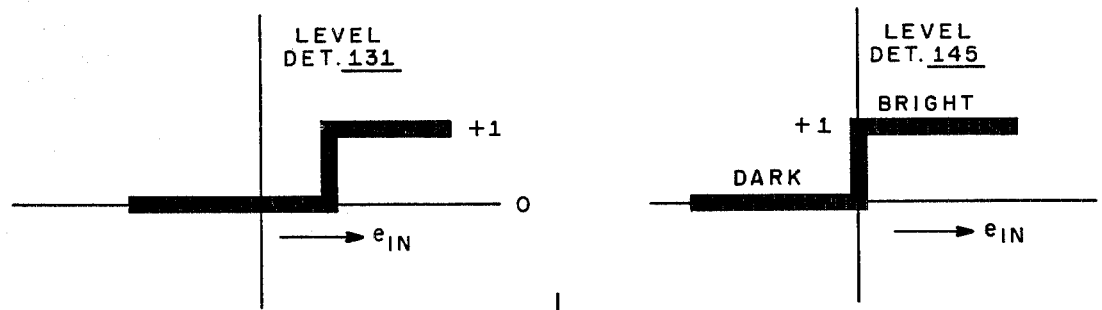
FIG.6.
FIG.8.
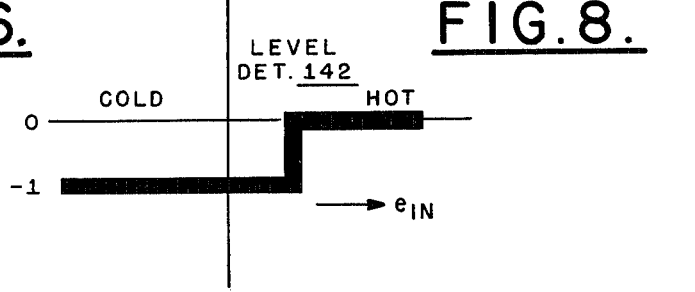
FIG.7.

HYBRID DUAL MODE RADIOMETRIC SYSTEM

BACKGROUND OF THE INVENTION

1. Field of the Invention

The invention pertains generally to the art of high frequency radiometry which in the past has often employed the comparison of the amplitude of a signal to be investigated, such as a thermal or other noise signal, with the amplitude of a locally generated standard noise reference signal. In more particular, the invention pertains to the art of high frequency radiometry in which a single collimating aperture is employed in a novel system for accurately performing both active illuminated and passive radiometric measurements upon objects which represent sources of such thermal or other noise signals.

2. Description of the Prior Art

The comparison radiometer has been used for the study of low-level noise-like radio signals, especially where the amplitudes of those signals are small in comparison to the noise level generated within the radiometer. Comparison radiometers achieve substantial cancellation of the receiver background noise and self-noise, permitting relatively accurate measurements of the magnitudes of low-level radio signals.

One type of radiometer often used in high frequency bands is that in which an incoming signal to be investigated and a standard or calibrated reference noise signal are compared in amplitude. The method consists essentially of the comparison of the unknown noise signal amplitude with a known amplitude noise signal from a calibrated source. In such instruments, the input to receiver elements is switched cyclically between the unknown signal and the noise reference signal at a relatively high rate, and the detected receiver output is coupled to a phase sensing detector operated in synchronism with the switching rate. The amplitude of the final output signal is proportional to the difference between the temperature of the noise reference signal and the effective temperature of the source viewed by the radiometer antenna, because the phase sensing detector acts automatically to substract receiver background and internal noise.

Passive radiometric systems have advantages in that they are passive and therefore do not interfere with operation of other radio equipment; they also operate in most types of weather, are simple and reliable, and are relatively inexpensive. However, the performance of such prior art radiometric systems with respect to targets at relatively great ranges has been less than fully satisfactory because of the limited basic radiometric temperature contrast between such selected targets and their spatial background. Furthermore, there is a significantly increasing dilution effect at large target ranges because of the constant angular width receptivity pattern of directive antennas employed in such radiometer systems.

In more recent radiometric systems, facilities have been added for providing detection of targets at greater ranges and for accurately performing illuminated or active radiometric measurements thereupon as well as passive measurements. In such systems, signals to be investigated are again received by a single antenna and are compared with reference signals provided by a reference signal generator. A switching device cyclically applies the received and reference signals within the intermediate frequency section of the radiometer receiver. The output of the detector of the receiver is an alternating signal having a strong component at the switching frequency. This alternating component is applied through an amplifier to a phase sensitive detector and thence to a signal integrator circuit and may finally operate a display calibrated in terms of temperature.

Such radiometers may be operated in a generally conventional manner as in a passive radiometric system or may be used in a second mode providing transmission of noise signals for illumination of a remote target. The broad band noise power is continuously transmitted, being directed by the single antenna to the selected target. The transmitter and receiver elements cooperate with the single directive antenna, the high frequency portion of the radiometer system being supplied with a suitable signal generation and isolation system for permitting continuous wave transmission when the system is operated in its active mode. Such systems overcome to a useful extent certain fundamental defects of prior art comparison radiometers, including the limited temperature contrast of the usual target with respect to its spatial background, as well as the dilution effect characteristic of conventional radiometric antennas.

More recently, there has been advanced a system additionally lending target range measurement capability to such prior art radiometric systems in a fully compatible manner in such a way that the beneficial features of those prior systems are not compromised. Such a system makes maximum use of common components of existing active-passive systems, uses a single antenna aperture, and uses a single high-frequency oscillator both as transmitter and receiver local oscillator. It additionally retains in active mode operation the beneficial measurement features provided for use in the passive mode of operation. This recent system will be further mentioned herein and provides means for detecting targets at relatively great distances and for accurately performing active illuminated and passive radiometric measurement thereupon, including target range measurements when operating in its active mode. The system features operation selectively in passive or active modes, providing in the active mode incoherent f.m. continuous wave illumination of a selected target for improving the measured radiometric temperature contrast between the target and its spatial background. Composite noise and triangular wave frequency modulation elements in a closed-loop control system yield a constant receiver beat frequency in a sensor system in which range data is derived. The latter prior art system is one in which a composite noise and triangular wave frequency modulation are provided for the high frequency signal illuminating the selected target through a single antenna, thus augmenting the apparent temperature of the selected target with respect to its spatial background and providing a closed-loop control system for extracting target range data.

SUMMARY OF THE INVENTION

In the present radiometric system, the sensor employs a common horizontally polarized antenna and a high frequency receiver system followed by separate active and passive receiver channels in a configuration affording time-shared active and passive modes of operation for the correlation of active and passive signal returns collected by the antenna. The processed, normalized, and stored signals are subtracted from other similarly processed, normalized, and stored signals arising in the dual channel system for the generation of a combined output in which adverse effects of back ground terrain returns are significantly reduced, thus enhancing true target recognition signals. A second channel of the output system provides discrimination against spurious signals, thus reducing flase alarm events.

BRIEF DESCRIPTION OF THE DRAWINGS

FIG. 4 is a detailed block diagram of the gain computer employed in FIG. 1.

FIG. 5 is a detailed block diagram of one form of the logic circuits coupled to terminals 73b, 93b of FIG. 1.

FIGS. 6, 7, and 8 are graphs useful in explaining operation of the apparatus of FIG. 5.

DESCRIPTION OF THE PREFERRED EMBODIMENTS

Figure 1:
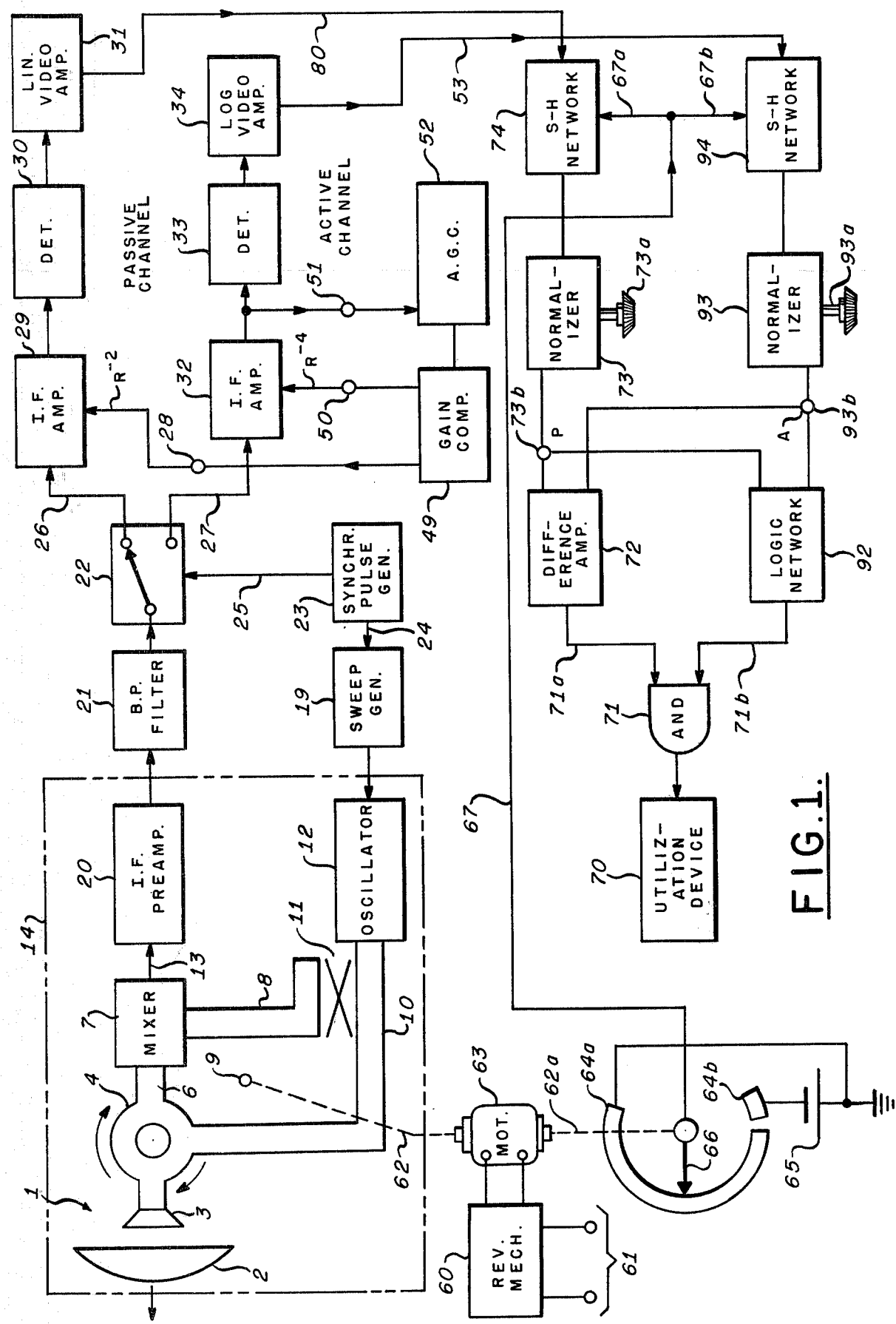
FIG. 1 is a block diagram of the novel radiometer system showing its components and their electrical interconnections.

The present invention combines signals derived in a hybrid active, passive short wave radiometer in such a manner as to achieve increased target-to-clutter discrimination, reduced false alarms, and a generally improved target detection capability. With such a hybrid radiometer system, two different sources of signal information become available and the two signal sources are used to enhance the distinctiveness of a ground based target signal with respect to noise-like background or terrain signals. In the passive radiometer mode, natural thermal radiation is measured, based upon the reflection properties of the terrain. In the active mode of the hybrid radiometer, the return signal measurement is based upon the backscattering properties of the terrain. The basis for the improved operation of the invention is related to correlation between the active and passive outputs of the radiometer receiver system. Advantageously, good correlation exists between the radiometric temperature and the active back scatter cross-section with a horizontally polarized antenna for producing an antenna beam (FIG. 3) incident upon the terrain at angles between 30° and 60° above the horizontal 110. On the other hand, a negative correlation prevails for complex metal targets such as tanks, trucks, bridges, or the like. The scattering feature and the ability to use the passive mode to detect short wave energy above the ambient temperature level are combined according to the invention to discriminate against false targets and to increase target detection capability.

The primary factors that determine the useful signals processed by the novel radiometer system can be divided into two categories: the properties of the sensor and the individual properties of the terrain and target. The two operational modes of the system utilize as common properties the same frequency band and the same antenna polarization and aperture; thus, the degree of correlation between the generated output signals must depend primarily upon target and terrain properties.

The fundamental characteristics of the terrain which affect the active mode return signal are terrain surface roughness and its complex dielectric constant, carrier frequency, and antenna polarization and its beam incidence angle. For the passive mode of operation, the same properties apply and there is, in addition, the physical temperature of the terrain surface and the apparent temperature of surrounding features, particularly the sky.

Of all parameters, terrain roughness has the major effect on the difference in received signal strengths for the active and passive modes. Most terrain surfaces can be classified as either specular, such as water, asphalt, or concrete or diffuse, such as trees or grass. For specular reflection, incident active mode radiation is scattered in the specular direction away from the irradiated area. For an active system with beam incidence angles lying between 30° and 60°, forward scatter is high, backscatter is low, and the resultant backscatter cross-section is low.

In passive operation of the novel system, the high reflection from a specular terrain surface results in dispersion of much of the energy into the cold sky; consequently, the apparent terrain temperature is low, corresponding to a low backscatter cross-section. As the terrain surface reflectivity increases, the backscatter cross-section and the apparent temperature of the intercepted terrain both decrease.

On the other hand, for rough and therefore diffusely reflecting terrain, the backscatter is generally high at all incidence angles. For terrain that supports forests or other green vegetation, the individual leaves of the plants are very reflective because of their high moisture content and they provide high backscatter. On the other hand, such vegetation has a warm radiometric temperature because the random leaf orientation reflects considerable energy from warm surroundings.

Figure 3:
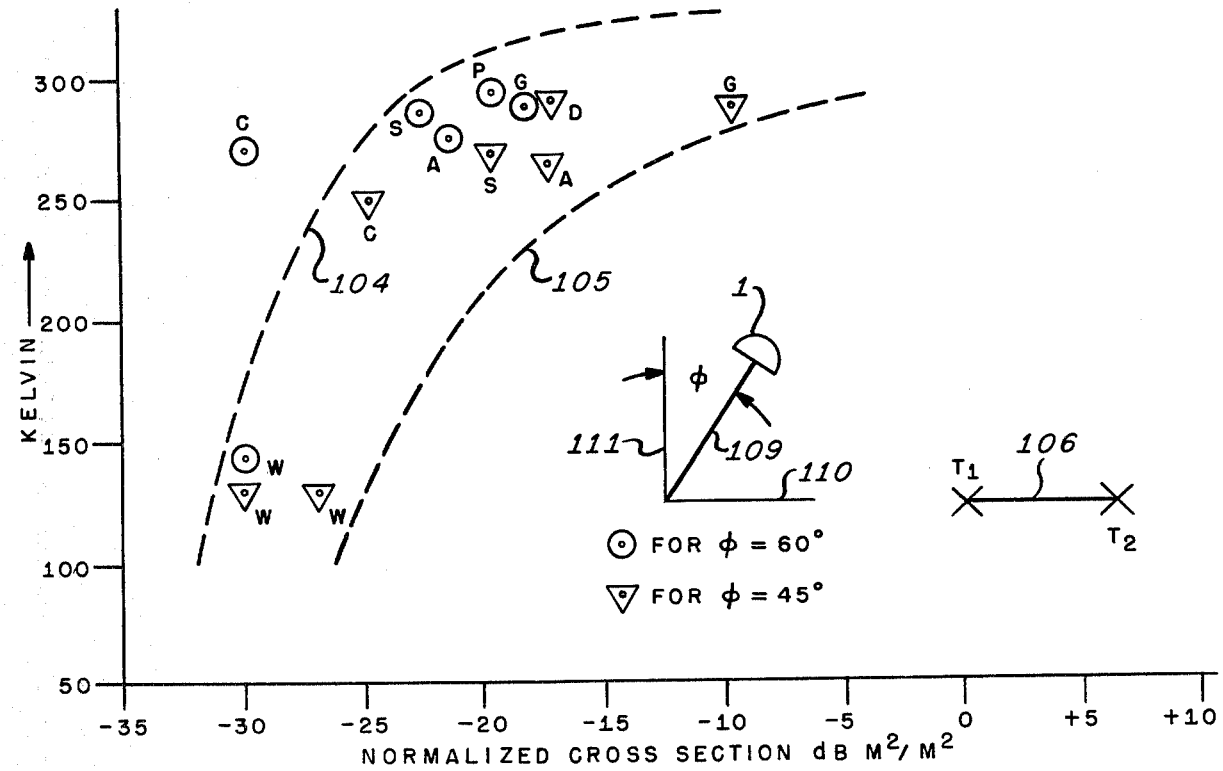
FIG. 3 is an experimental graph illustrating terrain and target reflection characteristics.

FIG. 3 illustrates an experimentally derived comparison of radiometric temperature and normalized cross-section for several types of terrain:

W = water,
C = concrete,
S = sand
P = plowed ground,
G = grass, and
A = asphalt.

The points located in the graph within circles are for a 60° angle of beam incidence with respect to the vertical 111 and those within triangles are for a 45° angle of beam incidence with respect to the vertical. The graph indicates generally that, for horizontally polarized energy and for beam incidence angles between 45° and 60°, there is generally single valued relation between the two factors in the sense that most values fall between boundaries 104 and 105; i.e., as radiometric temperature increases, the cross-section increases except for the case of the typical complex metal targets $T_1$ and $T_2$ at 106 in FIG. 3.

Targets such as tanks or trucks have dominant scattering sources in the form of flat surfaces, corner reflectors, cylindrical surfaces, and other interacting surfaces. Consequently, the backscatter cross-section of such targets is high and, when normalized with respect to the physical area of the target, the cross-section lies typically between zero and +5 db m$^2$/m$^2$. This is considerably greater than for most types of terrain. The passive radiometric temperature of targets is normally colder (typically 125° K. or less) than the terrain, a result that is caused by the flat horizontal surfaces that reflect the beam into the sky. Thus, FIG. 3 illustrates the high degree of active-to-passive correlation in typical terrain with the exception of target signals which have greater but opposite polarity contrast with respect to the background.

In the present invention, a radiometric system adaptable to use in several applications is illustrated. Therefore, it will be understood that the horizontally polarized antenna 1, illustrated in FIG. 1 as including a collimating lens 2 cooperating with an electromagnetic horn 3, represents only one of several possible antenna configurations which may advantageously be employed with the invention. Though other types of antennas may be used, such as gimbal-mounted tracking and searching antennas, the invention is shown for purposes of illustration as utilizing a microwave lens or other collimator 2 having a cooperating horn 3 connected to a wave guiding transmission line system. The electromagnetic horn 3 may be scanned at least in azimuth for scanning a directive radiation pattern about a normally vertical axis 9. Such operation may be effected in the conventional manner or as further described in the R. E. Lazarchik et al U.S. Pat. No. 3,787,857 for a "Dual Mode Radiometric System", issued Jan. 22, 1974 and assigned to the Sperry Rand Corporation. Reference may also be had to the U.S. Pat. No. 2,415,103 to H. Langstroth for a "Directive Antenna Structure", issued Feb. 4, 1947 and assigned to the same assignee. Antenna 1 may additionally or alternatively be moved about a normally horizontal axis under manual or automatic control and about a vertical axis in a manner also discussed in the aforementioned Lazarchik et al patent, or conical scanning of the radiation pattern may be used for developing directional control error signals for use in guiding a craft.

Figure 2:
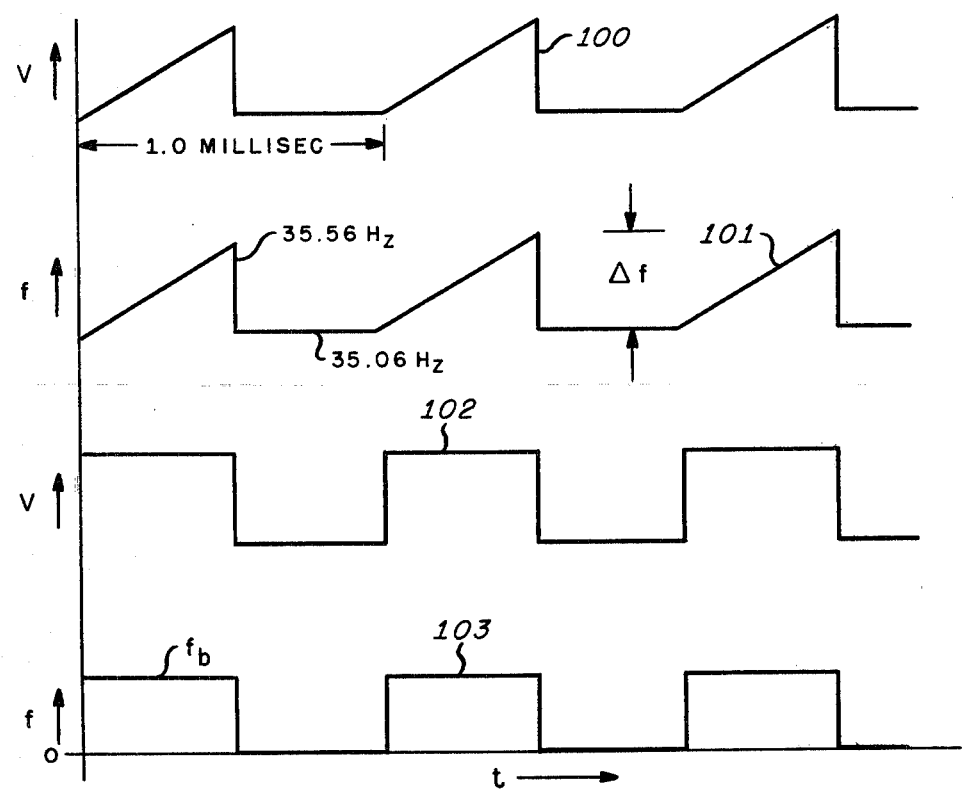
FIG. 2 presents wave form graphs useful in explaining the operation of the invention.

The directive horn 3 is coupled to one port of the conventional multi-port transmission line circulator 4; a second port of circulator 4 is coupled by transmission line 6 to a first port of a conventional high frequency, low noise mixer 7, while a third port of circulator 4 is coupled through transmission line 10 to the voltage-controlled oscillator 12. Oscillator 12, when the system is operating, continuously supplies local oscillator energy through directional coupler 11 and transmission line 8 to a second port of mixer 7. The output of oscillator 12, illustrated by wave 101 of FIG. 2, has alternating constant carrier frequency and swept frequency portions, as will be explained.

Any output of low noise balanced mixer 7 supplied on conductor 13 is coupled for amplification by a conventional intermediate frequency amplifier 20, after which it is passed through wide band pass filter 21 to switch 22. Filter 21 acts to suppress low intermediate frequency signals which may occur due to leakage of circulator 4 and to the reflection of high frequency power in antenna 1. Switch 22 may be a switch of known type having one of two possible stable conditions both under control of a conventional internal switch driver as synchronized by the stable pulse generator 23. Pulse generator 23 drives switch 22 via lead 25 synchronously with its driving of the sweep voltage generator 19 via lead 24. In this manner, switch 22, which is indicated symbolically as a matter of convenience in FIG. 1 as a simple mechanical switch, is cyclically moved between leads 26, 27 by wave form 102 of FIG. 2, which wave also synchronously causes the generation of sweep wave 100 and of the carrier wave 101 of FIG. 2.

In this manner, the transmitter-receiver system operates so as to provide reception and processing of alternately received active and passive signals. These signals are, in essence, time-shared through the common aperture of lens 2 and the described receiver elements 20, 21, 22 into two parallel processing channels at a modulation rate, for example, of 1 kHz. A first or passive channel having an input lead 26 operates while the carrier frequency of oscillator 12 is constant (at 35.0 GHz, for example). The second or active processing channel has an input lead 27 and operates while the carrier frequency of oscillator 12 is swept upward and is then returned to its initial value (for example, between 35.0 and 35.5 GHz.). Thus, the transmitted wave form is that conventionally spoken of as an interrupted frequency-modulated continuous wave carrier signal, having a half cycle of linearly swept carrier and a fixed carrier for each remaining half cycle. The switching period is selected to be long compared to the active signal delay time of propagation to the target and back (1000 microseconds, for example, as compared to the 10 microsecond delay characteristic of an arbitrary target range of 5,000 feet). In this manner, there is no undesired cross-talk between the active and passive half cycles of the apparatus.

In each half cycle period of the active mode of operation, the linearly swept output wave 100 of sweep generator 19 is applied to the voltage tunable oscillator 12 which may be, for example, a varactor-tuned Gunn diode oscillator. A sample of the actual transmitted signal 101 provides a local oscillator signal via a conventional directional coupler 11 and transmission line 8 to mixer 7, wherein it is heterodyned with the received signal to produce a constant difference or intermediate frequency signal 103 where frequency is proportional to the range of the corresponding target. With switch 22 instantaneously coupled to lead 27, the resultant beat signal is coupled instantaneously to intermediate frequency amplifier 32 of the active mode processing channel.

In each half cycle period of the passive mode of operation, sweep generator 19 applies a unidirectional voltage to oscillator 12 which sets its output frequency at a constant level (say 35 GHz). With that local oscillator frequency held constant, passive thermal energy as collected by antenna 1 flows into receiver mixer 7 as upper and lower side bands about a 35 GHz center frequency. The radio frequency band width is ±600 MHz as determined by the upper cut-off frequency of intermediate frequency amplifier 20. The transmitted carrier, any leakage signals, and the reflected target energy do not interfere with passive operation, because a zero beat frequency is then produced by mixer 7, is rejected by the common intermediate frequency band pass amplifier 21, and is further blocked upon reaching the band pass amplifier 29 of the passive channel.

It is noted that the active channel following switch 22 and lead 27 includes an intermediate frequency amplifier 32, a detector 33, and a logarithmic video amplifier 34. In a generally similar manner, the parallel passive channel following switch 22 and lead 26 includes in series connection an intermediate frequency amplifier 29, a detector 30, and a linear video amplifier 31. While it is generally preferred that the characteristic of amplifier 31 be linear, some departure from strict linearity may be tolerated. One function of the alternately operated active and passive receiver processor channels is to provide initial scaling of the corresponding active and passive signals so as to yield the best degree of linearity between the radiometric temperature and the normalized background cross-section as discussed in connection with FIG. 3. The scale factors of the two parallel processing channels are determined by three features of the circuit:

(a) a dual channel automatic gain control signal derived in the active channel, (b) logarithmic intermediate frequency amplification in the active channel for providing an output proportional to normalized cross-section, and (c) preferably linear intermediate frequency amplification in the passive channel for providing the best linear approximation between passive temperature and active cross section.

As previously noted, the time-shared receiver intermediate frequency signal is cyclically coupled to the active and passive processor channels by switch 22 when operated by the synchronizing pulse generator 23 so as to switch at the end of each half cycle of modulation. In the active channel, the signal is coupled via lead 27 to an intermediate frequency amplifier 32 having, in the example being illustrated, a band pass typically including 1 to 10 MHz; its upper and lower cut-off frequencies are selected to be compatible with the predetermined minimum and maximum operating target ranges selected for the apparatus. In the passive channel, an intermediate frequency amplifier 29 is selected having a wide band width, including 50 to 600 MHz, for example, to obtain high sensitivity. A sharp cut-off is used for amplifier 29 below 50 MHz, for example, that blocks leakage, antenna reflections, return signals, and oscillation frequency modulation noise from entry into amplifier 31. This feature provides simplicity for the transmitter-local oscillator system whereby the fixed-tuned oscillator frequency of 35 GHz allows the signal to be transmitted and received without interference, eliminating any need for gating during signal transmission.

A second function of the active processor channel in addition to backscatter measurement is to determine target range R or a function corresponding thereto for providing automatic gain control for the amplifiers 29, 32 of both the active and passive processor channels. These automatic gain control signals prevent undesired receiver saturation and provide initial scaling of the received active and passive signals. Both of the gain control error signals are derived from the intermediate frequency output at terminal 51 of amplifier 32 as supplied to a conventional gain control voltage generator 52, wherein the input signal is first internally limited and is then fed to an internal frequency discriminator having a band width matching that of intermediate frequency amplifier 32. As in the usual automatic gain control, the voltage output of its internal discriminator is proportional to the beat frequency which, in turn, is proportional to target range R.

The output of gain control circuit 52 is coupled to a gain signal computer circuit 49 which produces two separate output signals respectively proportional to $R^{-2}$ and to $R^{-4}$ as shown in more detail in FIG. 4. The output of the gain controller 52 is coupled to a conventional analog squaring circuit 120 of gain computer 49 for producing a voltage proportional to $R^2$. The latter is supplied as one input to the conventional analog divider 122 along with a constant unity or reference voltage supplied by reference voltage generator 121. The input voltages for divider 122 are arranged so that its output at terminal 28 is a function of $R^{-2}$, as required for use in the passive channel amplifier 29. The $R^{-4}$ signal is simply produced by processing the $R^{-2}$ signal in a second analog squaring circuit 123, whereupon it is available on terminal 50 for use in the gain control of active channel amplifier 32.

In this manner, the gain signal computer circuit 49 of FIG. 1 uses conventional analog computing circuits to generate the respective active and passive channel gain control error voltages proportional to $R^{-4}$ and to $R^{-2}$, the passive channel gain control term $R^{-2}$ being derived from the active channel amplifier 32 because a passive radiometer channel carries no range information. The gain control error voltage in the case of the active mode channel is a higher order function of range R to the target than for the passive mode because of the two way versus one way paths. For the active mode, the reflected signal is always proportional to $R^{-4}$ whereas, for the passive mode, the corresponding signal, which is a change in temperature contrast as the antenna scans across the target, is proportional to $R^{-2}$.

As previously noted, the outputs of intermediate amplifiers 29 and 32 are respectively coupled through detectors 30 and 33 and video amplifiers 31 and 34. Detectors 30, 33 recover the respective active and passive signal modulation envelopes of the target and background. In the active channel, the signal is coupled to logarithmic video amplifier 34, which provides an output proportional to the normalized cross-section. In the passive receiver channel, the detected signal is fed from detector 30 to linear video amplifier 31. The exact gain characteristic of amplifier 31 may be tapered experimentally to achieve the highest degree of linearity between radiometric temperature and the normalized cross-section from the active channel.

The active and passive signals from the video scaling circuits just described are coupled respectively via leads 53, 80 as inputs to the dual channels of a computer network system. More specifically, the active signals are coupled by lead 53 to the input of a conventional sample-and-hold network 94, while the passive signals are coupled by lead 80 to the input of a similar sample-and-hold network 74. The stored data is periodically taken from the sample-and-hold devices, for example, during each azimuth sector scan of antenna 1 on platform 14 and its vertical axis 9, which axis will normally lie on the axis of symmetry of antenna 1. For sector scanning of the platform 14 and antenna 1 about axis 9, a reversible motor 63 driving shaft 62 is provided with an excitation voltage from a power source (not shown) at leads 61, which motor 63 is rotated according to its excitation polarity as determined by a conventional reversing mechanism 60. An extension 62a of shaft 62 sector scans a contact 66 along a grounded arcuate sector 64a. At the end of each sector scan of antenna 1 and contact 66, the latter momentarily contacts conductive segment 64b, sending an impulse from battery 65 through leads 67, 67a, 67b instantaneously to discharge the data stored in sample-and-hold networks 74, 94 into the respective normalizer circuits 73, 93.

Thus, the active and passive signals on leads 53 and 80 are coupled to dual circuits that normalize each of the signals in each computer network channel to its standard deviation over a complete angular sector scan cycle. The circuits 74, 94 sample and store the input video signals in each channel as antenna 1 is scanned. Normalizers 73, 93 then compute, in effect, the mean values of their input signals and determine the standard deviation about the computed mean value. The normalizers may be conventional automatic devices that set the standard deviation to unity before delivering output signals to the remaining computer network circuits.

Normalizer 73 may take any of several simple forms, including that of a simple potentiometer or divider resistance network of two resistors connected between network 74 and ground, and with a common point adjustable by manual control 73a between the two resistors coupled through terminal 73b to difference amplifier 72, for example. Normalizer 93 may be similarly set by control 93a. Often, the adjustment of a normalizer setting is merely a simple factory adjustment.

The objective of the generation of the normalized active and passive signals is to combine them for exploiting the correlation between active and passive signals in order to increase the probability of target recognition and to reduce false alarm events. A pair of independent computing paths is employed, each using both normalized signals as inputs. First, the outputs of both normalizers 73, 93 at terminals 73b, 93b are coupled to difference amplifier or subtracter 72, the normalized passive signal being subtracted from the normalized active signal. Because there is a high degree of correlation between the active and passive returns from a typical background terrain, the background signal is suppressed in the subtraction process. On the other hand, for the case of a complex metal target, the passive target signal is of opposite polarity with respect to the active target signal and the subtraction process will produce a large output from difference amplifier 72. The mere absence of a passive target signal at longer ranges does not limit the possibility of reliable active target detection. In a generally similar way, the outputs of normalizers 73 and 93 are also coupled to the logic network 92; this network uses coincidence logic to minimize the number of false target alarm events as will be further explained.

The operation of the arrangement includes final coupling of the outputs of circuits 72, 92 via leads 71a, 71b to an AND gate 71 for application to a utilization device 70, which latter may be a control device or an alarm such as a conventional visual or audible alarm device. The combination of the signals applied from AND gate 71 provides proper discrimination of jamming signals or of a burning vehicle, for example, with respect to a new target such as an operational tank, bridge, or the like, as follows:

TABLE 1

| | LOGIC OPERATION | | |
|---|---|---|---|
| Signal Source | Active | Passive | Acquisition |
| Jammer (Low Power) | Dark or Bright | Hot | No |
| Burning Vehicle | Bright | Hot | No |
| Corner Reflector or Active Decoy | Bright | Neutral | No |
| Vehicle | Bright | Cold | Yes |

Thus, final detection of a target and a corresponding alarm is effected at the output of AND gate 71 when opposed acquisition signals are present simultaneously on the outputs of difference amplifier 72 and of logic network 92.

FIG. 5 illustrates in more detail a computer instrumentation of the final output circuits of the invention for processing the active and passive signals found at the terminals 93b, 73b of FIG. 1. In the upper signal path, the signals from terminals 73b, 93b are respectively coupled by leads 133, 134 to inputs of a conventional difference circuit or amplifier 132 wherein the active and passive signals are subtracted to suppress the background signal, to enhance the target signal, and thus to increase the signal-to-clutter ratio. Difference amplifier 132 is followed by a conventional signal level detector which, as in FIG. 6, yields a 0 or a +1 signal to one input of AND gate 71. For reliable target detection, the threshold level of detector 131 is set about 10 dB, for example, above the residual terrain signal at the output of difference amplifier 132. Alternatively, the normalized active and passive video signals may be processed by a conventional multiplier or a cross-correlator in place of difference amplifier 132.

The respective active and passive video signals at terminals 93b and 73b are also passed, as has been discussed, to a coincidence logic circuit for minimizing false target alarms. The passive video is fed to a level detector 142 having the response shown in FIG. 7. The output of detector 142 in the form of a −1 or 0 signal is coupled through inverter 141 and lead 143 to one input of AND gate 140, which latter examines active-passive coincidence. The passive target signal response as shown in Table 1 is cold to neutral, whereas jamming signals and burning targets will appear hot to the radiometer. Thus, the level detector 142 and inverter 141 provide a +1 level to AND gate 140 only when a normal cold or neutral target is present. In the active signal channel starting at terminal 93b, a level detector 145 with the response shown in FIG. 8 provides a +1 to the second input of AND or coincidence gate 140 when the active return from the target is bright; i.e., is a high level return signal relative to that of the terrain. Passive false target signals such as those arising from a lake or other water surface appear as low signal or dark returns in the active channel and thus are blocked by AND gate 140.

The signals appearing at the outputs of level detector 131 and AND gate 140 are coupled by the respective leads 130, 135 to inputs of the final AND gate 71. The final AND gate 71 preceding the target alarm 70 or other utilization device is used to insure alarm actuation only by coincidence between signals on leads 130, 135. Thus, the combined processing to enhance signal-to-clutter ratio and to minimize false alarm rate provides an improved target detection capability over previous systems which employ active or passive processing entirely separately or only one or the other.

It is understood from the foregoing that the invention adds some complexity to prior radiometer systems such as that of the Lazarchik et al patent, for example, because two types of signals are processed and it is necessary to store and to normalize those signals for each antenna scan period. The invention is, indeed, a hybrid radiometer apparatus for the reception and processing of information in signals from two different sources. The sensor employs a common antenna aperture and associated high frequency section, followed by separate active and passive receiver channels for signal scaling and video processing. The common antenna aperture is horizontally polarized and the angle of incidence of the antenna directive pattern with respect to the terrain is normally arbitrarily selected between 30° and 60° above the horizontal in order to achieve the highest degree of correlation between passive radiometric temperature and the active cross-section of typical terrain background.

The invention takes the form of a time-shared active, passive radiometer using interrupted frequency modulation continuous wave radiation where alternate half cycles of the modulation in the form of a linear saw tooth modulation of the carrier frequency are used for active-cross section and range measurement; in the intervening half cycles, constant carrier frequency operation is used during passive operation. Using principles somewhat similar to those of the apparatus of the aforementioned Lazarchik et al patent and adaptable for cooperative use therewith, the present invention is further characterized by the use of interrupted frequency modulation providing time-shared operation of the system between active and passive modes at a 1 kHz rate, for example. The common wide band intermediate frequency pre-amplifier is employed to amplify both the active low frequency beat signal and the passive high frequency thermal radiation. A synchronous intermediate frequency switch controlled at the mode switching rate is used to separate the time-shared signals, coupling them into the proper receiver channel for processing.

The gain characteristics of the latter active and passive receiver channels are tailored to achieve the best possible linear correlation between radiometric temperature and backscatter cross-section of typical terrain. Accordingly, voltages related to range R are derived in the active receiver channel to regulate the gains of each channel. The gain control voltages are proportional to $R^{-4}$ and to $R^{-2}$ for the active and passive channels, respectively. High sensitivity is preserved in the passive channel with wide band width (extending from 50 to 600 MHz, for example) and in the active channel with narrow band width (extending from 1 to 10 MHz, for example).

The computer network section of the hybrid radiometer accepts and stores the video signal in each receiver channel during each antenna scan period, computes the standard deviation, and normalizes the resultant signal with respect to a unity voltage. The normalized signals are then delivered to a parallel dual channel section including in separate current paths a simple difference circuit and a logic network. In this manner, the processed, normalized, and stored passive signal is subtracted from the similarly treated active signal to suppress the returns from background terrain, thus enhancing target signals. Second, the logic network is used to discriminate against jamming signals and signals from burning objects, thus reducing false alarms.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. A high frequency radiometric system having azimuth scanning directive antenna means and receiver means and characterized by cyclic operation in an active mode wherein transmitted high frequency energy is radiated and received and a passive mode wherein radiometric noise signals are received, said high frequency radiometric system comprising:

synchronizer means, voltage controlled high frequency generator means for producing a cyclic signal having successive swept and constant carrier frequency portions in response to said synchronizer means during said respective active and passive modes, isolator means for coupling a first portion of said cyclic signal from said voltage controlled high frequency oscillator means for illumination of a target by said directive antenna means in a terrain radiating radiometric noise signals, coupler means for coupling a second portion of said cyclic signal from said voltage controlled high frequency oscillator means to said receiver means for generating therein a beat frequency signal, active and passive signal detector means, switch means responsive to said synchronizer means for coupling said beat frequency signal to said active signal detection means during said active mode and to said passive signal detector means during said passive mode, computer means responsive to said active and passive detector means for yielding a response substantially only in the presence of said target while suppressing effects of said radiometric signals, said computer means including at least:

first sample-and-hold means responsive to said passive detector means, second sample-and-hold means responsive to said active detector means, sampling control means cyclically actuated by said azimuth scanning directive antenna means for sampling the contents of said first and second sample-and-hold means for yielding processed passive and active signals, and respective normalizer means for normalizing said processed passive and active signals, utilization means responsive to said normalizer means in the presence of said response.

2. Apparatus as described in claim 1 wherein said passive signal detector means includes:

first intermediate frequency amplifier means responsive to said switch means during said passive mode, first video detector means responsive to said first intermediate frequency amplifier means, and substantially linear video amplifier means responsive to said first video detector means.

3. Apparatus as described in claim 2 wherein said active signal detector means includes:

second intermediate frequency amplifier means responsive to said switch means during said active mode, second video detector means responsive to said second intermediate frequency amplifier means, and substantially logarithmic video detector means responsive to said second video detector means.

4. Apparatus as described in claim 3 further including gain control signal generator means responsive to said second intermediate frequency amplifier means for generating a signal substantially inversely proportional to the square of the distance to said target for controlling the gain of said first intermediate frequency amplifier.

5. Apparatus as described in claim 3 further including gain control signal generator means responsive to said second intermediate frequency amplifier means for generating a signal substantially inversely proportional to the fourth power of the distance to said target for controlling the gain of said second intermediate frequency amplifier.

6. Apparatus as described in claim 1 wherein said computer means includes:

first and second parallel logic channels both responsive to said processed passive and active signals, and first AND gate means responsive to coincidence outputs of said first and second parallel logic channels, said first logic channel comprising:

difference circuit means for yielding a first output proportional to the difference between said processed passive and active signals, and first level detector means responsive to said first output for supply to said first AND gate.

7. Apparatus as described in claim 6 wherein said second logic channel comprises:

second level detector means responsive to said processed passive signal, inverter means responsive to said second level detector means, third level detector means responsive to said processed active signal, and second AND gate means responsive to said inverter means and to said third level detector means, said first AND gate means being responsive to coincident outputs of said first level detector means and said second AND gate means.

8. Apparatus as described in claim 7 wherein said first level detector means yields a positive output for inputs substantially above zero.

9. Apparatus as described in claim 7 wherein said second level detector means yields a zero output for inputs substantially above zero and yields a negative output for other inputs.

10. Apparatus as described in claim 7 wherein said third level detector means yields a positive output only for inputs above zero.

11. Apparatus as described in claim 1 wherein said utilization means includes alarm means.

* * * * *